US010306081B2

(12) United States Patent
Neistat et al.

(10) Patent No.: US 10,306,081 B2
(45) Date of Patent: May 28, 2019

(54) TECHNOLOGIES FOR GENERATING A POINT-OF-VIEW VIDEO

(71) Applicant: Beme Inc., New York, NY (US)

(72) Inventors: Casey Neistat, New York, NY (US); Matthew Hackett, Brooklyn, NY (US); Colin McArdell, Ridgewood, NY (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 14/795,583

(22) Filed: Jul. 9, 2015

(65) Prior Publication Data

US 2017/0013190 A1    Jan. 12, 2017

(51) Int. Cl.
| | |
|---|---|
| *H04N 1/00* | (2006.01) |
| *H04N 9/82* | (2006.01) |
| *G11B 27/34* | (2006.01) |
| *H04N 5/232* | (2006.01) |
| *H04N 5/77* | (2006.01) |
| *H04M 1/725* | (2006.01) |

(52) U.S. Cl.
CPC ......... *H04N 1/00244* (2013.01); *G11B 27/34* (2013.01); *H04M 1/72569* (2013.01); *H04N 5/23222* (2013.01); *H04N 5/23293* (2013.01); *H04N 5/772* (2013.01); *H04N 9/8205* (2013.01)

(58) Field of Classification Search
None
See application file for complete search history.

(56) References Cited

U.S. PATENT DOCUMENTS

| | | | | |
|---|---|---|---|---|
| 8,385,950 B1* | 2/2013 | Wagner | ............... | H04L 67/06 455/414.2 |
| 2010/0171846 A1* | 7/2010 | Wood | ............... | H04N 1/00323 348/231.99 |
| 2013/0198788 A1* | 8/2013 | Barger | ............... | H04N 21/2668 725/93 |
| 2013/0202274 A1* | 8/2013 | Chan | ............... | H04N 5/77 386/362 |
| 2013/0297686 A1* | 11/2013 | Bilinski | ............... | H04L 65/60 709/204 |
| 2014/0118597 A1* | 5/2014 | Tabak | ............... | H04N 5/23293 348/333.02 |

(Continued)

*Primary Examiner* — Hung Q Dang
(74) *Attorney, Agent, or Firm* — Barnes & Thornburg LLP

(57) ABSTRACT

Technologies for generating a point-of-view video of a user include determining whether a mobile communication device is positioned in a reference point-of-view position relative to a body of the user and, if so, initiating recording of a video without direction from the user. The point-of-view position may be defined as, for example, a position near the chest of the user. The recording of the video is initiated automatically in response to the user moving the mobile communication device to the point-of-view position. The recording may occur for a pre-defined reference length of time. The recorded video may be automatically uploaded to a remote video server upon competition of the recording. The remote server may aggregate associated videos into a stack and transmit stacks of recorded videos to the mobile communication device. Upon viewing a stack of associated videos, the stack of videos may be automatically deleted from the mobile communication device.

20 Claims, 8 Drawing Sheets

(56) References Cited

U.S. PATENT DOCUMENTS

2014/0232633 A1\* 8/2014 Shultz ............... H04M 1/72522
  345/156
2015/0194186 A1\* 7/2015 Lee ..................... H04N 5/772
  386/224
2015/0350846 A1\* 12/2015 Chen .................... H04W 4/04
  455/456.1

\* cited by examiner

TECHNOLOGIES FOR GENERATING A POINT-OF-VIEW VIDEO

BACKGROUND

Mobile communication devices, such as smartphones, tablet computers, and laptops, are quickly becoming ubiquitous tools for the average user. Mobile communication devices may be used for a variety of purposes including communication, entertainment, and content generation, such as pictures and video. To facilitate such uses, the typical mobile communication device may include an array of sensors and input/output devices, such as cameras, microphones, speakers, displays, and the like.

Although the typical mobile communication device may include appropriate components for content generation (e.g., a camera for recording of video), using such components for some particular purposes can be overly complicated and time intensive. For example, to record a video, the typical mobile communication device may require the user to select the camera icon from a user interface, position the mobile communication device in a suitable location to allow the user to view a display screen, select a record icon to begin the recording, and select a stop icon to stop the recording. Additionally, if the user desires to share the recorded video, the user is required to perform additional steps to upload and share the recoded video.

SUMMARY

According to one aspect, a mobile communication device for generating a point-of-view video of a user may include a camera, at least one sensor configured to generate sensor data, a position detection module, and a recordation module. The position detection module may be configured to determine whether the mobile communication device is positioned in a reference point-of-view position relative to a body of the user based on the sensor data. The recordation module may be configured to initiate, in response to a determination that the mobile communication device is positioned in the reference point-of-view position, recording of a video by the camera.

In some embodiments, the position detection module may be configured to determine that the mobile communication device is positioned in the reference point of view position based on a determination that the mobile communication device is (i) in proximity to the body of the user and (ii) in a portrait orientation. In such embodiments, the at least one sensor may be embodied as one or more proximity sensors, gyroscope sensors, accelerometer sensors, and/or a light sensors.

Additionally, in some embodiments, the mobile communication device may further include an output device, such as a tactile output device, and the recordation module may be further configured to generate, in response to initiation of the recording of the video, a notification to the user via the output device to notify the user that recording of the video has been initiated. Additionally or alternatively, the position detection module may be further configured to monitor a present position of the mobile communication device relative to the body of the user to determine whether the mobile communication device has been moved from the reference point-of-view position and the recordation module may be further configured to discontinue recording of the video in response to a determination that the mobile communication device has been moved from the reference point-of-view position.

In some embodiments, the recordation module may be configured to record the video for a reference length of time. In such embodiments, the mobile communication device may further include a communication module configured to upload, without direction from the user, the recorded video to a remote video server in response to expiration of the reference length of time. Additionally, in some embodiments, the communication module may be further to receive, from the remote video server, a video update that identifies a plurality of associated videos available for viewing by the user. In such embodiments, the mobile communication device may further include a display and a video playback module. The video playback module may be configured to display an icon on the display, wherein the icon represents the plurality of associated videos; sequentially play, in response to a selection of the icon by the user, each video of the plurality of associated videos on the display, and remove, without direction from the user, the icon that represents the plurality of associated videos from the display in response to each video of the plurality of associated videos having been played.

According to another aspect, a method for generating a point-of-view video of a user may include determining, by a mobile communication device, whether the mobile communication device is positioned in a reference point-of-view position relative to a body of the user and initiating, in response to a determination that the mobile communication device is in the reference point-of-view position and without direction from the user, recording of a video by a camera of the mobile communication device.

In some embodiments, determining whether the mobile communication device is positioned in the reference point-of-view position may include determining whether the mobile communication device is (i) in proximity to the body of the user and (ii) in a portrait orientation. In such embodiments, determining whether the mobile communication device is positioned in the reference point-of-view position may include determining whether the mobile communication device is positioned in the reference point-of-view based on sensor data from at least one of a proximity sensor, a gyroscope sensor, an accelerometer sensor, or a light sensor of the mobile communication device.

Additionally, in some embodiments, the method may further include generating, by the mobile communication device and in response to initiation of the recording of the video, a notification to the user to notify the user that recording of the video has been initiated. Additionally or alternatively, the method may further include monitoring, by the mobile communication device, a present position of the mobile communication device relative to the body of the user to determine whether the mobile communication device has been moved from the reference point-of-view position and discontinuing recording of the video in response to a determination, by the mobile communication device, that the mobile communication device has been moved from the reference point-of-view position.

In some embodiments, initiating recording of the video may include recording the video for a reference length of time. In such embodiments, the method may further include uploading, without direction from the user, the recorded video to a remote video server in response to expiration of the reference length of time. Additionally, in some embodiments, the method may further include receiving, by the mobile communication device and from the remote video server, a video update that identifies a plurality of associated videos available for viewing by the user; displaying, by the mobile communication device, an icon on a display of the mobile communication display, wherein the icon represents the plurality of associated videos; sequentially playing, in response to a selection of the icon by the user, each video of the plurality of associated videos on the display, and removing, without direction from the user, the icon that represents the plurality of associated videos from the display in response to each video of the plurality of associated videos having been played.

According to a further aspect, one or more computer-readable storage media may include a plurality of instructions stored thereon that, in response to execution, cause a mobile communication device to determine whether the mobile communication device is positioned in a reference point-of-view position relative to a body of the user and initiate, in response to a determination that the mobile communication device is in the reference point-of-view position and without direction from the user, recording of a video by a camera of the mobile communication device.

In some embodiments, to determine whether the mobile communication device is positioned in the reference point-of-view position may include to determine whether the mobile communication device is (i) in proximity to the body of the user and (ii) in a portrait orientation. In such embodiments, to determine whether the mobile communication device is positioned in the reference point-of-view position may include to determine whether the mobile communication device is positioned in the reference point-of-view based on sensor data from at least one of a proximity sensor, a gyroscope sensor, an accelerometer sensor, or a light sensor of the mobile communication device.

Additionally, in some embodiments, the plurality of instructions may further cause the mobile communication device to generate, in response to initiation of the recording of the video, a notification to the user to notify the user that recording of the video has been initiated. Additionally or alternatively, the plurality of instructions may further cause the mobile communication device to monitor a present position of the mobile communication device relative to the body of the user to determine whether the mobile communication device has been moved from the reference point-of-view position and discontinue recording of the video in response to a determination, by the mobile communication device, that the mobile communication device has been moved from the reference point-of-view position.

In some embodiments, to initiate recording of the video comprises to record the video for a reference length of time. In such embodiments, the plurality of instructions may further cause the mobile communication device to upload, without direction from the user, the recorded video to a remote video server in response to expiration of the reference length of time. Additionally, in some embodiments, the plurality of instructions may further cause the mobile communication device to receive, from the remote video server, a video update that identifies a plurality of associated videos available for viewing by the user; display an icon on a display of the mobile communication display, wherein the icon represents the plurality of associated videos; sequentially play, in response to a selection of the icon by the user, each video of the plurality of associated videos on the display, and remove, without direction from the user, the icon that represents the plurality of associated videos from the display in response to each video of the plurality of associated videos having been played.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
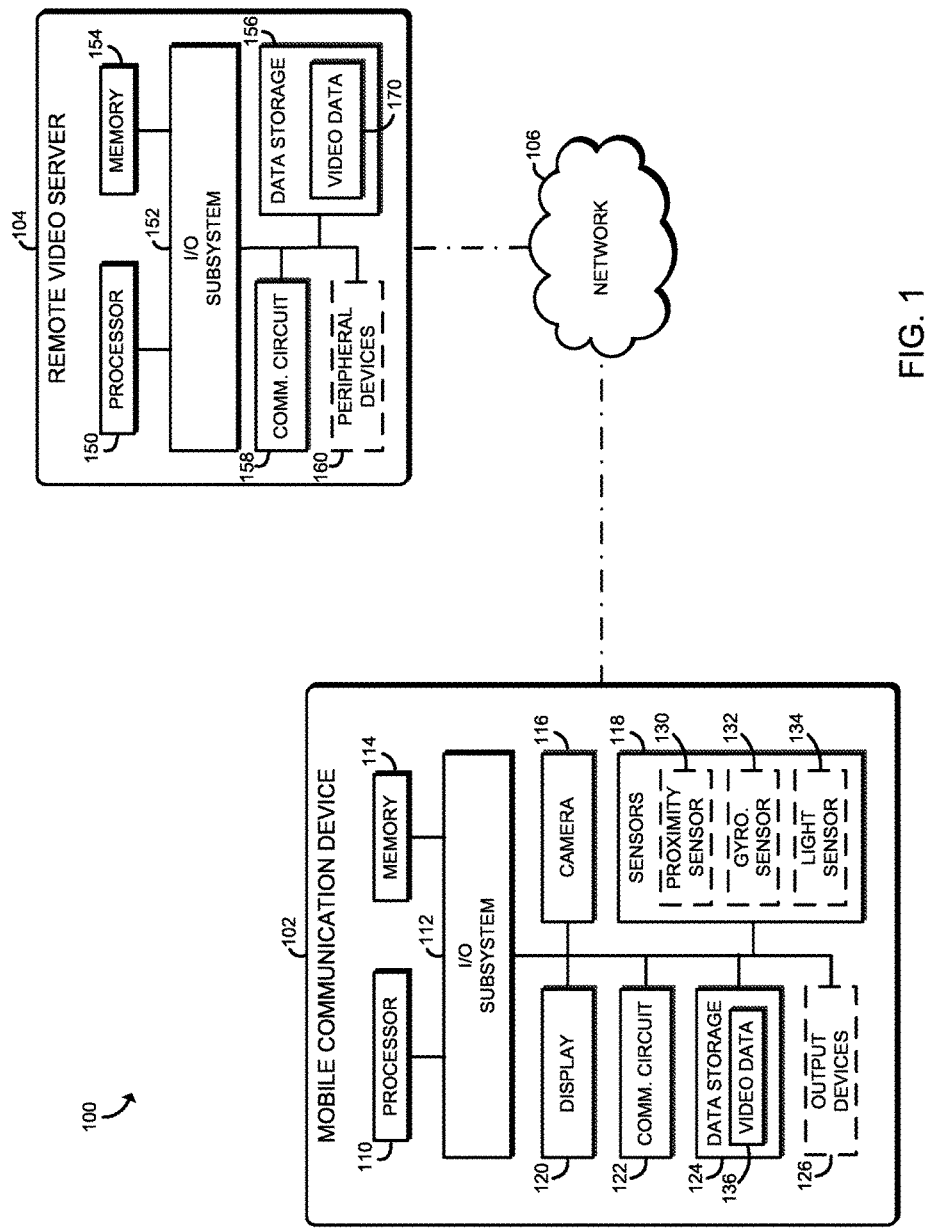
FIG. 1 is a simplified block diagram of at least one embodiment of a system for generating a point-of-view video including a mobile communication device and a remote video server.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for generating a point-of-view video of a user includes a mobile communication device 102 and a remote video server 104, which are configured to communicate with each other over a network 106. Although only a single mobile communication device 102 is shown in FIG. 1, it should be appreciated that the system 100 may include additional mobile communication devices 102 in other embodiments. Similarly, although only a single remote video server 104 is shown in FIG. 1, the system 100 may include multiple servers 104 in other embodiments.

Figure 8:
FIG. 8 is a simplified illustration of a user recording a point-of-view video using the mobile communication device of FIGS. 1 and 2.

In use, a user of the mobile communication device 102 may initiate recording of a video by positioning the mobile communication device 102 in a pre-defined point-of-view position. As discussed in more detail below, the mobile communication device 102 is configured to detect when the device 102 is moved to the reference point-of-view position and automatically begin recording upon determining that the point-of-view position has been achieved. The point-of-view position may be embodied as any reference position relative to the body of the user that facilitates the recording of video from the viewing perspective of the user. For example, in the illustrative embodiment, the mobile communication device 102 is configured to detect when the device 102 is positioned in the portrait orientation and near the body of the user (e.g., near the user's chest as shown in FIG. 8). It should be appreciated that such positioning provides a recording location of the mobile communication device 102 that simulates the viewing perspective of the user. Of course, other reference positions relative to the user's body may be used in other embodiments. For example, the reference point-of-view position may be defined as a portrait orientation near the user's head, a landscape orientation near the user's body or head, and/or the like.

As discussed above, the mobile communication device 102 is configured to automatically initiate recording of a video upon detecting that the device 102 has been positioned in the reference point-of-view position. As such, it should be appreciated that, in the illustrative embodiment, no direction, instruction, or other interaction by the user of the mobile communication device 102 is required to cause the initiation of the recording. Rather, the mobile communication device 102 begins recording automatically in response to the device 102 being positioned in the reference point-of-view position. In the illustrative embodiment, the mobile communication device 102 is configured to record for a pre-defined reference length of time (e.g., four seconds). The user may discontinue recording by moving the mobile communication device 102 from the reference point-of-view position. After the mobile communication device 102 has recorded a video for the reference length of time, the mobile communication device 102 uploads the recorded video to the remote video server 104. In the illustrative embodiment, the mobile communication device 102 uploads the video upon completion of the recording, without direction, instruction, or other interaction by the user. In this way, a user may simply move the mobile communication device 102 to the reference point-of-view position to automatically record and upload a video, which is illustratively recorded from the point-of-view of the user.

The remote video server 104 is configured to receive recorded videos from the mobile communication devices 102 and manage the recorded videos. In the illustrative embodiment, the remote video server 104 aggregates videos associated with each other into groupings or "stacks." To do so, the remote video server 104 may analyze metadata associated with each received video (e.g., the identity of the user recording the video, the date or time of the video, the location at which the video was recorded, user-defined tags, etc.) and/or the content of each received video (e.g., identity of individuals or places in the video). The remote video server 104 may subsequently publish the grouping or stack of videos to various mobile communication devices 102 for playback thereon.

The mobile communication device 102 may be embodied as any type of mobile computing device capable of wireless communication and performing the functions described herein. For example, the mobile communication device 102 may be embodied as or otherwise include, without limitation, a smartphone, a cellular phone, a tablet computer, a notebook computer, a laptop computer, a wearable computer, a messaging device, a multiprocessor system, a processor-based system, a consumer electronic device, and/or any other computing device capable of wireless communication. In the illustrative embodiment, the mobile communication device 102 includes a processor 110, an I/O subsystem 112, a memory 114, a camera 116, one or more sensors 118, a display 120, a communication circuit 122, and a data storage 124. Of course, the mobile communication device 102 may include other or additional components, such as those commonly found in a mobile computer (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 110 in some embodiments The processor 110 may be embodied as any type of processor capable of performing the functions described herein. For example, the processor 110 may be embodied as a single or multi-core processor(s), a single or multi-socket processor, a digital signal processor, a microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile communication device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile communication device 102. For example, the I/O subsystem 112 may be embodied as, or otherwise include, memory controller hubs, input/output control hubs, firmware devices, communication links (e.g., point-to-point links, bus links, wires, cables, light guides, printed circuit board traces, etc.) and/or other components and subsystems to facilitate the input/output operations.

The camera 116 may be embodied as a digital camera or other digital imaging device capable of capturing images and video. Illustratively, the camera 116 is integrated with the mobile communication device 102. To facilitate the capturing of video, the camera 116 may include an electronic image sensor, such as an active-pixel sensor (APS), e.g., a complementary metal-oxide-semiconductor (CMOS) sensor, or a charge-coupled device (CCD).

The sensor(s) 118 may be embodied as or otherwise include any type of sensor capable of generating sensor data indicative of the present position of the mobile communication device 102 or from which the present position may be determined. For example, in the illustrative embodiment, the sensors 118 may include one or more proximity sensors 130 configured to generate sensor data indicative of whether the mobile communication device 102 is in proximity to a structure, such as the body of the user. Additionally or alternatively, the sensors 118 may include one or more gyroscope sensors 132 configured to generated sensor data indicative of the orientation (e.g., portrait or landscape) of the mobile communication device 102. The sensors 130 may also include one or more light sensors 134 configured to generate sensor data indicative of whether the mobile communication device is in near or within a structure (e.g., near the user's chest, in the user's pocket, etc.). Of course, in other embodiments, the sensor(s) 118 may include additional or other sensors capable of generating sensor data indicative of the present position of the mobile communication device such as the camera 116, an acoustic sensor, an accelerometer, and/or other sensors. Regardless, as discussed in more detail below, the mobile communication device 102 may determine whether the device 102 is in the reference point-of-view position based on the sensor data generated by the sensors 118.

The display 120 may be embodied as any type of display capable of displaying digital information such as a liquid crystal display (LCD), a light emitting diode (LED), a plasma display, a cathode ray tube (CRT), or other type of display device. As described below, the display 120 may be used to display a graphical user interface or other information to the user of the mobile communication device 102.

The communication circuit 122 may be embodied as any type of communication circuit, device, or collection thereof, capable of enabling communications between the mobile communication device 102 and the remote video server 104. To do so, the communication circuit 122 may be configured to use any one or more communication technology and associated protocols (e.g., Ethernet, Bluetooth®, Wi-Fi®, WiMAX, CDMA, GSM, etc.) to effect such communication.

The data storage 124 may be embodied as any type of device or devices configured for the short-term or long-term storage of data. For example, the data storage 124 may include any one or more memory devices and circuits, memory cards, hard disk drives, solid-state drives, or other data storage devices. In the illustrative embodiment, the data storage 124 may store video data 136, which may include videos recorded by the mobile communication device 102 and/or videos received from the remote video server 104 for playback on the mobile communication device 102.

In some embodiments, the mobile communication device 102 may also include one or more output devices 126. The output devices 126 may be embodied as any type of device capable of generating an output signal including, but not limited to, a tactile output signal, a visual output signal, and/or an audible output single. For example, the output devices 126 may include a tactile vibration device, a light or display, and/or a speaker. As discussed below, the mobile communication device 102 may be configured to activate the output device(s) 126 to provide corresponding notifications to the user the mobile communication device 102.

Additionally, in some embodiments, the mobile communication device 102 may include one or more peripheral devices (not shown). Such peripheral devices may include any type of peripheral device commonly found in a mobile communication device such as, for example, a hardware keyboard, input/output devices, peripheral communication devices, and/or other peripheral devices.

The remote video server 104 of the system 100 may be embodied as any type of computation or computer device capable of performing the functions described herein, including, without limitation, a server, a rack-mounted server, a blade server, a computer, a multiprocessor system, a laptop computer, a notebook computer, a tablet computer, a network appliance, a web appliance, a distributed computing system, a processor-based system, and/or a consumer electronic device. Illustratively, the remote video server 104 includes a processor 150, an I/O subsystem 152, a memory 154, a data storage device 156, communication circuitry 158, and peripheral devise 160. Those individual components of the remote video server 104 may be similar to the corresponding components of the mobile communication device 102, the description of which is applicable to the corresponding components of the remote video server 104 and is not repeated herein so as not to obscure the present disclosure. As discussed in more detail below, the remote video server 104 is configured to receive recorded videos from the mobile communication device 102 and other devices, aggregate associated videos, store the associated videos as video data 170 in the data storage 156, and publish the videos to the mobile communication device 102.

Although illustrated in FIG. 1 as a single computing device, in some embodiments, the remote video server 104 may be embodied as a "virtual server" formed from multiple computing devices distributed across the network 106 and operating in a public or private cloud. Accordingly, although the remote video server 104 is illustrated in FIG. 1 as embodied as a single server computing device, it should be appreciated that the remote video server 104 may be embodied as multiple devices cooperating together to facilitate the functionality described below.

As discussed above, the mobile communication device 102 and the remote video server 104 are configured to communicate with each other over the network 106. The network 106 may be embodied as any number of various wireless and/or wired networks. For example, the network 106 may be embodied as, or otherwise include, a cellular network, a wireless local area network (LAN), a wireless wide area network (WAN), an Ethernet-based network, and/or a publicly-accessible, global network such as the Internet. As such, the network 106 may include any number of additional devices, such as additional computers, routers, and switches, to facilitate communications among the devices of the system 100.

Figure 2:
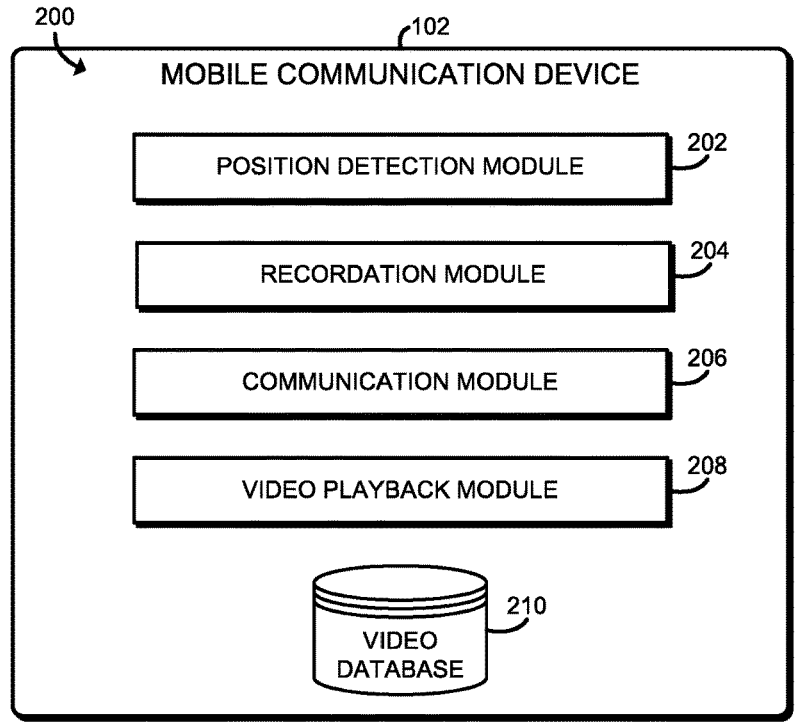
FIG. 2 is a simplified block diagram of at least one embodiment of an environment of the mobile communication device of the system of FIG. 1.

Referring now to FIG. 2, in use, the mobile communication device 102 may establish an environment 200. The illustrative environment 200 includes a position detection module 202, a recordation module 204, a communication module 206, and a video playback module 208. Each of the modules and other components of the environment 200 may be embodied as firmware, software, hardware, or a combination thereof. For example the various modules, logic, and other components of the environment 200 may form a portion of, or otherwise be established by, the processor 110, the I/O subsystem 112, an SoC, or other hardware components of the mobile communication device 102. As such, in some embodiments, any one or more of the modules of the environment 200 may be embodied as a circuit or collection of electrical devices (e.g., a position detection circuit, a recordation circuit, a communication circuit, a video playback circuit, etc.).

The position detection module 202 is configured to monitor the various sensor data generated by the sensors 118 and determine whether the mobile communication device 102 has been moved to the reference point-of-view position based on such sensor data. As discussed above, the point-of-view position may be embodied as any reference position relative to the body of the user that facilitates the recording of video from the viewing perspective of the user. For example, the position detection module 202 may be configured to determine whether the mobile communication device 102 is positioned in proximity to the body of the user (e.g., near the user's chest) and in the portrait orientation based on the sensor data as shown in FIG. 8.

The recordation module 204 is configured to initiate recording of a video using the camera 116 in response to the position detection module 202 determining that the mobile communication device 102 is in the reference point-of-view position. As discussed above, the initiation of the recording may occur automatically, without direction or interaction by the user. In the illustrative embodiment, the recordation module 204 is configured to record the video for a pre-defined length of time and halt recording if the mobile communication device 102 is moved from the reference point-of-view position during the recording. The recordation module 204 may store the recorded video permanently or temporarily as video data 136 in a video database 210, which may be located in the data storage 124.

After the recordation module 204 has recorded a video, the communication module 206 is configured to upload the recorded video to the remote video server 104 over the network 106. In the illustrative embodiment, the communication module 206 uploads the video to the remote video server 104 automatically, without user direction or interaction. That is, upon completion of the recording of the video, the communication module 206 may be configured to automatically upload the recorded video. In some embodiments, various metadata may be added to the recorded video prior to uploading the video to the remote video server 104. Such metadata may include any data useful by the remote video server 104 to identify associated videos including, but not limited to, the identity of the user, the date and time of the recording, the location of the recording, and so forth. Additionally, in some embodiments, the recorded video may be deleted after the video has been successfully uploaded.

The video playback module 208 is configured to receive videos from the remote video server 104 via the communication module 206 and manage playback of the received videos. As discussed in more detail below, the remote video server 104 may be configured to aggregate associated videos into groupings or stacks and publish the stacks of associated videos to one or more mobile communication devices 102. A user may activate playback of the videos associated with a given stack of videos by selecting a corresponding icon (e.g., a corresponding text blurb) displayed on a graphical user interface of the mobile communication device 102 as discussed in more detail below in regard to FIG. 7. In some embodiments, the video playback module 208 may automatically delete the selected stack of videos after the playback of each associated video has been completed. Such deletion may occur without direction, instruction, or interaction by the user.

Figure 3:
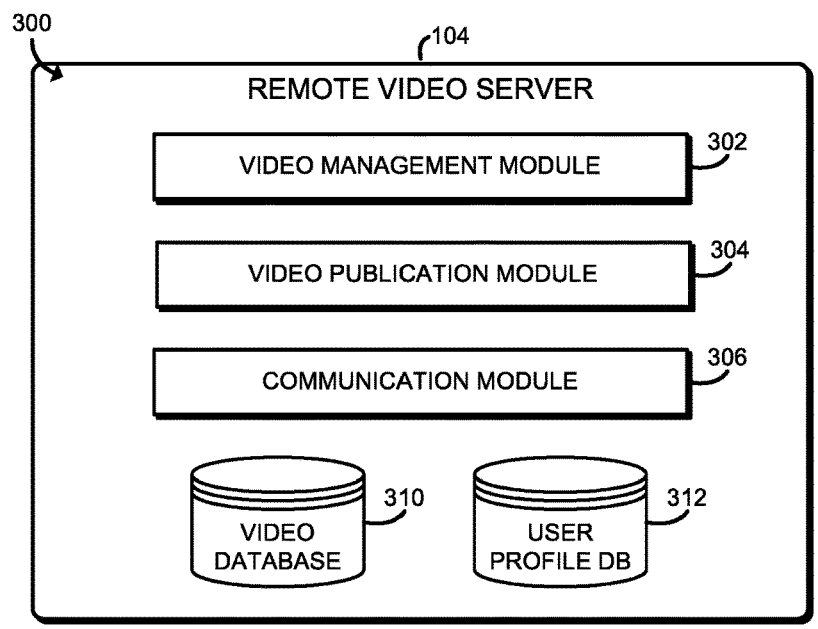
FIG. 3 is a simplified block diagram of at least one embodiment of an environment of the remote video server of the system of FIG. 1.

Referring now to FIG. 3, in use, the remote video server 104 may establish an environment 300. The illustrative environment 300 includes a video management module 302, a video publication module 304, and a communication module 306. Each of the modules and other components of the environment 300 may be embodied as firmware, software, hardware, or a combination thereof. For example the various modules, logic, and other components of the environment 300 may form a portion of, or otherwise be established by, the processor 150, the I/O subsystem 152, an SoC, or other hardware components of the remote video server 104. As such, in some embodiments, any one or more of the modules of the environment 300 may be embodied as a circuit or collection of electrical devices (e.g., video management circuit, a video publication circuit, a communication circuit, etc.).

The video management module 302 is configured to manage recorded videos received from the mobile communication devices 102. The video management module 302 may receive the recorded videos via the communication module 306. As discussed in more detail below, the video management module 302 may analyze each received video to determine whether the video is associated with one or more other videos and, if so, aggregate each associated video into a grouping or stack of videos. To do so, the video management module 302 may analyze metadata associated with each received video and group videos having similar metadata characteristics. For example, the video management module 302 may group videos received from the same user during a particular period of time. Further, the video management module 302 may group videos received from the same user and recorded at the same location (e.g., based on global positioning data (GPS) and/or Wi-Fi-derived location data generated or determined by the mobile communication device 102 and included as metadata with the video). Additionally or alternatively, the video management module 302 may group videos based on the content included in each video. For example, the video management module 302 may be configured to analyze each video to identify individuals included in the videos and group videos having the same individuals present in the captured video. As such, the video management module 302 may use any suitable algorithm or mechanism to determine whether two or more videos are associated with each other. After the video management module 302 has associated the videos into stacks or groupings, the video management module 302 may store the grouping or stack of videos in the video database 310.

The video publication module 304 is configured to publish the stacks or groupings of videos to the mobile communication device 102. To do so, the video publication module 304 may transmit, via the communication module 306, the stacks of videos to the mobile communication devices 102 based on a user profile of each corresponding user, which may be stored in a user profile database 312. The user profile may define, for example, which other users the user of a particular mobile communication device 102 is connected to or "following." That is, the user profile may identify other users whose videos the user of a particular mobile communication device 102 desires to receive and view. As such, the video publication module 304 may selectively transmit the stack of videos to various mobile communication devices based on the user profile of each user. Additionally, the video publication module 304 may continually, responsively, and/or periodically transmit the stacks or groupings of videos to the mobile communication devices 102.

Figure 4:
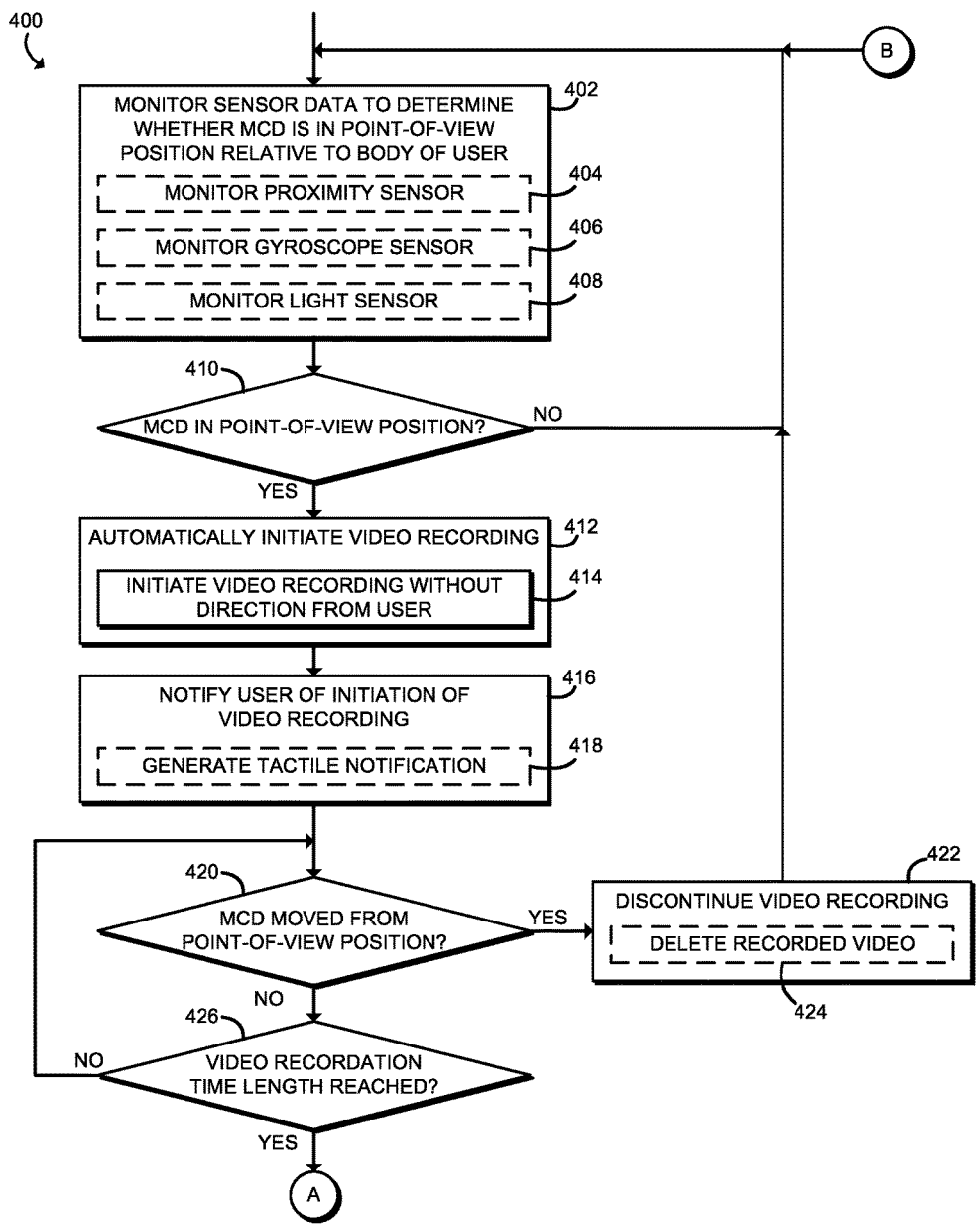
FIGS. 4 and 5 is a simplified flow diagram of at least one embodiment of a method for generating a point-of-view video that may be executed by the mobile communication device of FIGS. 1 and 2.
Figure 5:
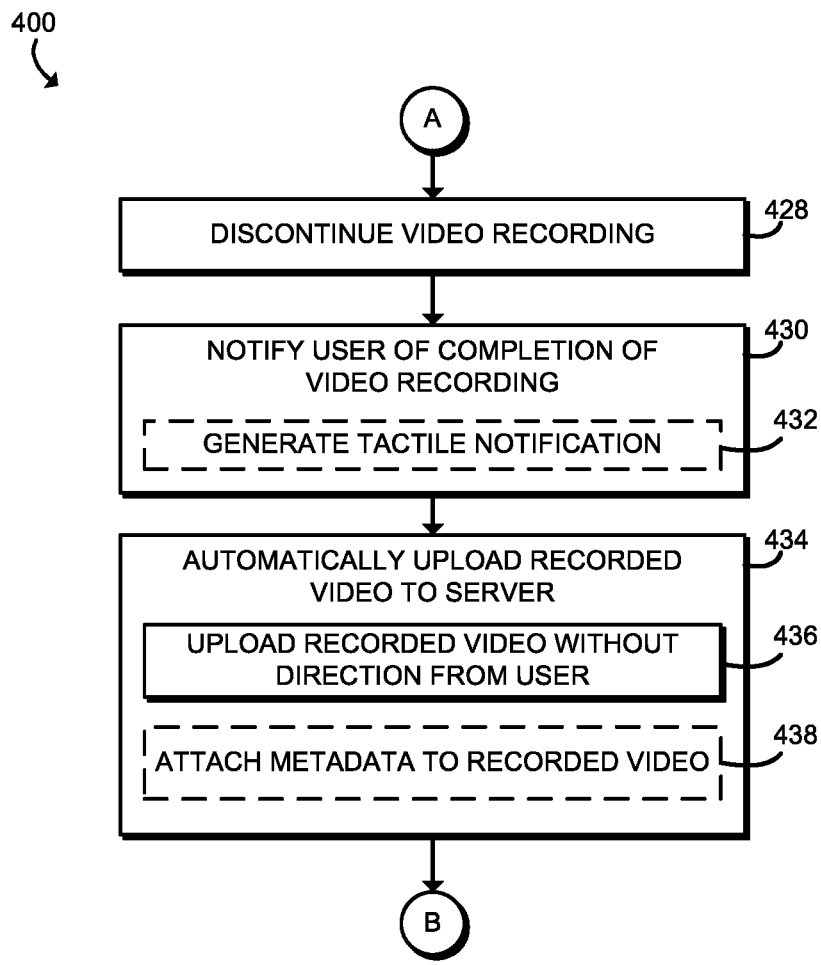

Referring now to FIGS. 4 and 5, in use, the mobile communication device 102 may executed a method 400 for generating a point-of-view video. In some embodiments, the mobile communication device 102 is configured to execute the method 400 in response to instruction from the user. For example, the user may select a corresponding application icon displayed on a user interface on the display 120 to cause the mobile communication device 102 to commence execution of the method 400. In other embodiments, the mobile communication device 102 may execute the method 400 continually or in response to some other criteria.

The method 400 begins with block 402 in which the mobile communication device 102 monitors the sensor data generated by the sensors 118 to determine whether the mobile communication device 102 has been moved to the reference point-of-view position. To do so, the mobile communication device 102 may monitor the sensor data generated by any one or more of the sensors 118. For example, in block 404, the mobile communication device 102 may monitor the sensor data generated by the proximity sensor(s) 130. Such proximity sensor data may be indicative of whether the mobile communication device 102 is located in proximity or otherwise near a structure, such as the body of the user (e.g., near the user's chest). Additionally or alternatively, in block 406, the mobile communication device 102 may monitor the sensor data generated by the gyroscope sensor(s) 132. Such gyroscopic sensor data may be indicative of the orientation of the mobile communication device 102 (e.g., whether the mobile communication device 102 is in the portrait, landscape, or other orientation). Further, in block 408, the mobile communication device 102 may monitor the sensor data generated by the light sensor 134. Such light sensor data may be indicative of whether the mobile communication device 102 is near or within a structure (e.g., near the user's chest, in the user's pocket, etc.) based on the available ambient light. Of course, the mobile communication device 102 may monitor and/or collect sensor data from other sensors, such as the camera 116, an accelerometer, and other sensors, in block 402 in other embodiments.

In block 410, the mobile communication device 102 determines whether the device 102 is in the reference point-of-view position. As discussed above, the reference point-of-view position may be defined as any reference position of the mobile communication device 102 relative to the body of the user that facilitates the recording of video from the viewing perspective of the user. In the illustrative embodiment, the reference point-of-view position is defined as a position near the user's chest and in the portrait orientation. As such, as shown in FIG. 8, a user 800 may move the mobile communication device 102 to the reference point-of-view position by holding the mobile communication device 102 in the portrait orientation near her or his chest with the camera 116 facing away from the user.

Referring back to FIG. 4, the mobile communication device 102 may determine the device 102 has been moved to the reference point-of-view position by analyzing the sensor data obtained in block 402. For example, the mobile communication device 102 may determine the device 102 is in the reference point-of-view position if the proximity sensor data indicates that the device 102 is near the user's body, the gyroscopic sensor data indicates that the device 102 is in the portrait orientation, and the light sensor data indicates a low light level at the front of the device 102 (i.e., the device 102 is being held close to an object such as the user's chest). Of course, in some embodiments, only some of the sensor data (e.g., only the proximity sensor data), a subset of the sensor data, or other sensor data may be used to determine whether the mobile communication device 102 is in the reference point-of-view position.

If the mobile communication device 102 determines that the device 102 is not in the point-of-view position, the method 400 loops back to block 402 in which the mobile communication device 102 continues to monitor the sensor data from the sensors 118. However, if the mobile communication device 102 determines that the device 102 has been moved to the reference point-of-view position in block 410, the method 400 advances to block 412. In block 412, the mobile communication device 102 initiates video recording using the camera 116. That is, the mobile communication device 102 initiates the video recording in response to the determination that the device 102 has been moved to the reference point-of-view position. In other words, the "trigger event" that causes the video recording to begin is defined as the positioning of the mobile communication device 102 in the reference point-of-view position. As such, it should be appreciated that the initiation of the recording of the video occurs automatically. For example, in block 414, the mobile communication device 102 may initiate recording of the video without direction, instruction, or otherwise interaction by the user.

After the video recording has been initiated in block 412, the mobile communication device 102 notifies the user that the video recording has been initiated. To do so, the mobile communication device 102 may activate one or more of the output devices 126 to generate any type of notification capable of alerting the user. For example, in block 418, the mobile communication device 102 may provide a tactile notification to the user (e.g., via activation of a vibration output device 126).

In block 420, the mobile communication device 102 determines whether the user has moved or relocated the mobile communication device 102 from the reference point-of-view position during the recording of the video. To do so, as discussed above in regard to blocks 402 and 410, the mobile communication device 102 may analyze the sensor data generated by the sensors 118. If the mobile communication device 102 determines that the device 102 has been moved from the reference point-of-view position, the method 400 advances to block 422 in which the mobile communication device 102 discontinues or otherwise stops the recording of the video. In some embodiments, in block 424, the mobile communication device 102 may also delete the recorded video. The method 400 subsequently loops back to block 402 in which the mobile communication device 102 continues to monitor for the positioning of the device 102 in the reference point-of-view position. It should be appreciated that the mobile communication device 102 may determine whether the device 102 is located at the reference point-of-view position within a threshold of error to allow an amount of movement or adjustment of the device 102 by the user without interruption of the video recording.

Referring back to block 420, if the mobile communication device 102 determines that the device 102 has not moved from the reference point-of-view position, the method 400 advances to block 426. In block 426, the mobile communication device 102 determines whether the video has been recorded for a predetermined, reference time length. That is, in some embodiments, the mobile communication device 102 is configured to automatically record a video for a set period of time (e.g., for four seconds). If the reference recording time length has not been reached, the method 400 loops back to block 420 in which the mobile communication device 102 again confirms that the device 102 has not been moved from the reference point-of-view position. If, however, the reference recording time length has been reached, the method 400 advances to block 428 of FIG. 5.

In block 428, the mobile communication device 102 discontinues or otherwise stops the recording of the video. Additionally, the mobile communication device 102 notifies that user that the video recording has completed in block 430. For example, as discussed above in regard to blocks 416 and 418, the mobile communication device 102 may provide a tactile notification to the user (e.g., via activation of a vibration output device 126) in block 432.

Subsequently, in block 434, the mobile communication device 102 uploads the recorded video to the remote video server 104. That is, in the illustrative embodiment, the mobile communication device 102 uploads the recorded video in response to completion of the video recording. In other words, the "trigger event" that causes the recorded video to be uploaded is defined as the completion of the recording of the video in block 428. As such, it should be appreciated that the uploading of the recorded video may be performed automatically. For example, in block 436, the mobile communication device 102 may upload the recorded video without direction, instruction, or otherwise interaction by the user.

In some embodiments, in block 438, the mobile communication device 102 may attach metadata to the recorded video prior to uploading the video to the remote video server 104. As discussed above, the metadata may include any type of data useful to the remote video server 104 to identify associated videos including, but not limited to, the identity of the user, the date and time of the recording, the location of the recording, and/or other types of data. After the recorded video has been uploaded to the remote video server 104, the method 400 advances back to block 402 in which the mobile communication device 102 continues to monitor for the positioning of the device 102 in the reference point-of-view position and, if so, begins recording a subsequent video. As such, it should be appreciated that multiple, sequential videos of the reference time length may be generated by the user by holding the mobile communication device 102 in the reference point-of-view position.

Figure 6:
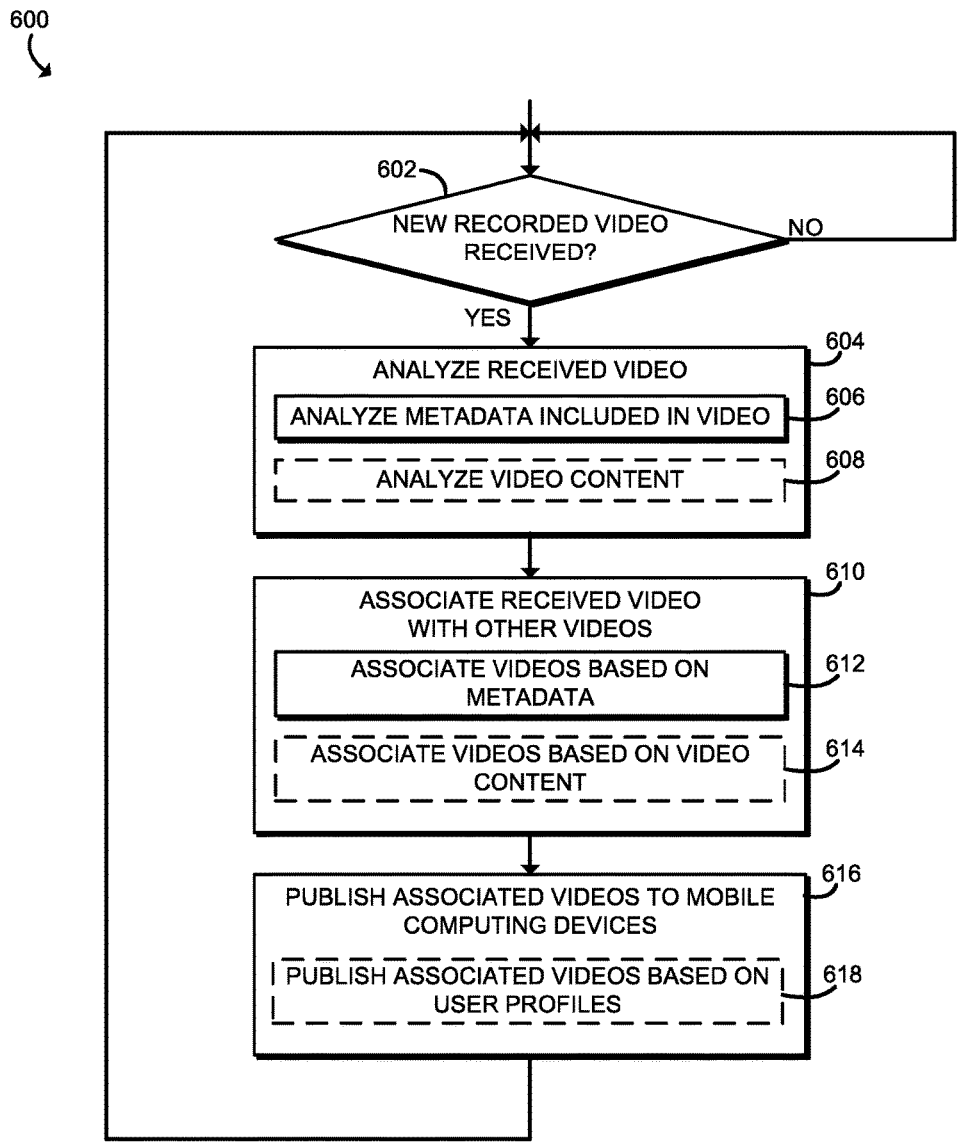
FIG. 6 is a simplified flow diagram of at least one embodiment of a method for managing recorded point-of-view videos that may be executed by the remote video server of FIGS. 1 and 3.

Referring now to FIG. 6, in use, the remote video server 104 may execute a method 600 for managing recorded point-of-view videos. The method 600 begins with block 602 in which remote video server 104 determines whether a new recorded point-of-view video has been received from a mobile communication device 102. If so, the method 600 advances to block 604 in which the remote video server 104 analyzes the received video to determine whether the video is associated with other received videos. For example, in block 606, the remote video server 104 may analyze metadata associated with the received video (e.g., user identification data, location data, time data, etc.). Additionally or alternatively, in some embodiments, the remote data server 104 may analyze the content of the received video. For example, the remote data server 104 may perform an object recognition analysis on the received video to identify individuals, structures, places, or other features included in the video.

In block 610, the remote video server 104 associates the newly received point-of-view video with other point-of-view videos based on the analysis performed in block 604. That is, the remote video server 104 associates videos having similar characteristics. In block 612, the remote video server 104 may associate the point-of-reference videos based on the metadata included with each video. For example, in remote video server 104 may associate videos from the same user and recorded within a pre-defined time of each other. Additionally or alternatively, the remote video server 104 may associate videos from the same user and recorded as the same location. Further, in some embodiments, the remote video server 104 may associate videos based on the content of each video. For example, the remote video server 104 may associate videos determined to include images of the same individual or the same location. It should be appreciated that the remote video server 104 may utilize any suitable algorithm or mechanism to determine which videos are associated with each other.

Subsequently, in block 616, the remote video server 104 publishes the associated videos to the mobile communication device 102 and/or other devices. To do so, the remote video server 104 may transmit the videos to the mobile communication device(s) 102 as a group or stack of associated videos. In some embodiments, the remote video server 104 may transmit each group or stack of videos to each mobile communication device 102 registered with the server 104 in a broadcast fashion. However, in other embodiments, the remote video server 104 may selectively transmit the grouping or stack of videos to the mobile communication devices 102 based on a user profile of the user of each mobile communication device 102 in block 618. As described above, the user profile may define which other users the user of a particular mobile communication device 102 is connected to or "following." As such, the remote video server 104 may transmit only the groupings or stacks of videos generated by users identified in the user profile of the user of the recipient mobile communication device 102. Of course, the remote video server 104 may also continually or periodically recommend stacks of videos from other users that the user of a particular mobile communication device 102 is not currently following. For example, the remote video server 104 may recommend video stacks of famous individuals, recommend video stacks related to or similar to other video stacks consumed by the user, recommend video stacks of users connected to a followed user, and so forth. Additionally, it should be appreciated that the remote video server 104 may transmit the generated groupings or stacks of videos continually, responsively, or periodically in a "push" or "pull" manner.

Figure 7:
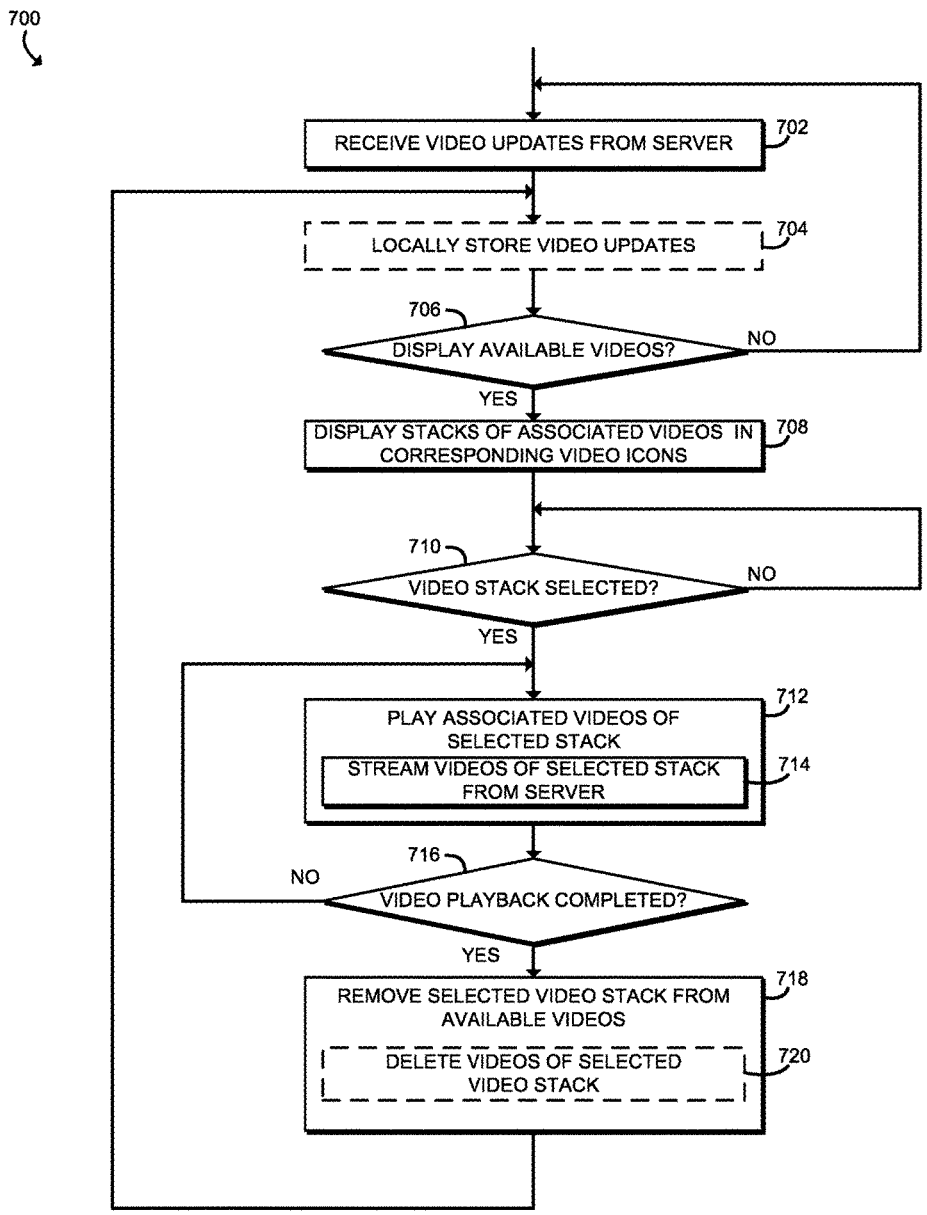
FIG. 7 is a simplified flow diagram of at least one embodiment of a method for playing recorded point-of-view videos that may be executed by the mobile communication device of FIGS. 1 and 2.

Referring now to FIG. 7, in use, the mobile communication device 102 may also execute a method 700 for playing recoded point-of-view videos. The method 700 begins with block 702 in which the mobile communication device 102 receive video updates from the remote video server 104. The video updates provide an indication of new groupings or stacks of videos that are available for viewing by the user on the mobile communication device 102. In some embodiments, the video updates may include the videos themselves, while in other embodiments, the video updates provide only an identifier of the videos or videos stacks, which are subsequently streamed from the remote video server 104 as discussed below. As discussed above, the remote video server 104 may continually, periodically, or responsively transmit the video updates. For example, in some embodiments, the mobile communication device 102 may receive the video updates upon initiation of an associated application of the mobile communication device 102.

Figure 9:
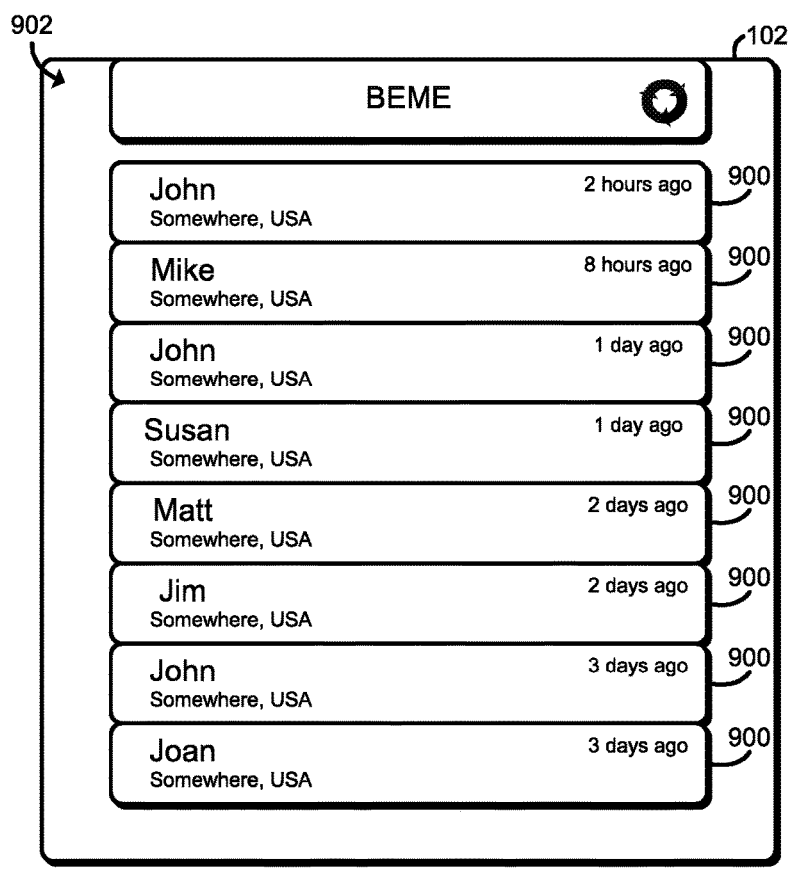
FIG. 9 is a simplified illustration of at least one embodiment of a user interface that may be displayed on the mobile communication device of FIGS. 1 and 2 during execution of the method of FIG. 7.

In some embodiments, in block 704, the mobile communication device 102 may store the video updates in a local storage. For example, in those embodiments in which the video updates include the videos themselves, the mobile communication device 102 may store the the received point-of-view video updates videos in the local data storage 124 (see, e.g., video data 136 of FIG. 1). In block 706, the mobile communication device 102 determines whether the user desires to view videos available for playback based on, for example, a selection or input from the user. If so, the method 700 advances to block 708 in which the mobile communication device 102 displays the stacks or groupings of associated videos as a corresponding icon. Such icons may be embodied as any type of graphical element that may be selectable by a user including text in a user interface cell, a button, a tab, or other graphical element. For example, as shown in FIG. 9, the mobile communication device 102 may display each individual stack or grouping of associated videos as a corresponding video icon or button 900 (e.g., text, a virtual button, etc.) on a user interface 902, which is displayed to the user via the display 120. Each video icon or button 900 represents a corresponding grouping or stack of associated videos.

The user of the mobile communication device 102 may view each associated video of a stack by selecting the corresponding icon or button 900. As such, in block 710 of FIG. 7, the mobile communication device 102 determines whether the user has selected a stack of videos for viewing. To do so, the user may select the corresponding icon or button 900 (see FIG. 9). For example, in some embodiments, the user may select the corresponding icon or button 900 by tapping and holding the icon or button 900 for a reference time period (e.g., for one second). Regardless, if the user has selected a stack of videos for playback, the method 700 advances to block 712 in which the mobile communication device 102 begins playing each associated video of the selected stack in sequence. To do so, in the illustrative embodiment, each associated video is streamed from the remote video server 104 in sequential order in block 714. Of course, in embodiments in which the associated videos are stored in the local data storage 124, the videos may be played directly from the mobile communication device 102 in block 712.

In block 716, the mobile communication device 102 determines whether the each associated video has been played. If not, the method 700 loops back to block 712 in which the playing or displaying of the associated videos is continued. However, if each associated video of the selected stack has been played, the method 700 advances to block 718 in which the selected stack of videos is removed from the list of available video stacks displayed to the user on the display 120 (e.g., via the user interface 902 of FIG. 9). Additionally, in those embodiments in which the associated videos are locally stored, the associated videos of the selected stack are deleted from the mobile communication device 102 in block 720. Such removal and/or deletion of the stack of videos and/or videos themselves may occur automatically upon completion of the playback of each video of the selected stack. The method 700 subsequently loops back to block 702 in which the mobile communication device 102 monitors for additional video updates from the remote video server 104. Of course, it should be appreciated that the user may view videos of displayed stack regardless of whether any new video update is received from the remote video server (i.e., the blocks 706-718 may be executed contemporaneously with block 702-704 in some embodiments).

The invention claimed is:

1. A mobile communication device for generating a point-of-view video of a user, the mobile communication device comprising:

a camera;

a proximity sensor configured to generate proximity sensor data;

a position detection module configured to determine that the mobile communication device is positioned in a reference point-of-view position relative to a body of the user in response to a determination that (i) the mobile communication device is within a threshold distance from the body of the user based on the proximity sensor data, (ii) the camera is directed away from the body of the user, and (iii) the mobile communication device is in a portrait orientation when the mobile communication device is in the reference point-of-view position; and a recordation module configured to initiate, in response to a determination that the mobile communication device is positioned in the reference point-of-view position and without direction from the user, recording of a video by the camera.

2. The mobile communication device of claim 1, further comprising an output device, and wherein the recordation module is further configured to generate, in response to initiation of the recording of the video, a notification to the user via the output device to notify the user that recording of the video has been initiated.

3. The mobile communication device of claim 1, wherein:

the position detection module is further configured to monitor a present position of the mobile communication device relative to the body of the user to determine whether the mobile communication device has been moved from the reference point-of-view position, and the recordation module is further configured to discontinue recording of the video in response to a determination that the mobile communication device has been moved from the reference point-of-view position.

4. The mobile communication device of claim 1, wherein the recordation module is configured to record the video for a reference length of time.

5. The mobile communication device of claim 4, further comprising a communication module configured to upload, without direction from the user, the recorded video to a remote video server in response to expiration of the reference length of time.

6. The mobile communication device of claim 5, wherein the communication module is further to receive, from the remote video server, a video update that identifies a plurality of associated videos available for viewing by the user, and further comprising a display and a video playback module, wherein the video playback module is configured to:

display an icon on the display, wherein the icon represents the plurality of associated videos;

sequentially play, in response to a selection of the icon by the user, each video of the plurality of associated videos on the display, and remove, without direction from the user, the icon that represents the plurality of associated videos from the display in response to each video of the plurality of associated videos having been played.

7. A method for generating a point-of-view video of a user of a mobile communication device, the method comprising:
generating, by a proximity sensor of the mobile communication device, proximity sensor data;
determining, by the mobile communication device, that the mobile communication device is positioned in a reference point-of-view position relative to a body of the user in response to a determination that (i) the mobile communication device is within a threshold distance from the body of the user based on the proximity sensor data, (ii) the camera is directed away from the body of the user, and (iii) the mobile communication device is in a portrait orientation when the mobile communication device is in the reference point-of-view position;
initiating, in response to a determination that the mobile communication device is in the reference point-of-view position and without direction from the user, recording of a video by the camera of the mobile communication device.

8. The method of claim 7, wherein determining whether the mobile communication device is positioned in the reference point-of-view position comprises determining whether the mobile communication device is positioned in the reference point-of-view based on sensor data from at least one of a proximity sensor, a gyroscope sensor, or a light sensor of the mobile communication device.

9. The method of claim 7, further comprising generating, by the mobile communication device and in response to initiation of the recording of the video, a notification to the user to notify the user that recording of the video has been initiated.

10. The method of claim 7, further comprising:
monitoring, by the mobile communication device, a present position of the mobile communication device relative to the body of the user to determine whether the mobile communication device has been moved from the reference point-of-view position; and
discontinuing recording of the video in response to a determination, by the mobile communication device, that the mobile communication device has been moved from the reference point-of-view position.

11. The method of claim 7, wherein initiating recording of the video comprises recording the video for a reference length of time.

12. The method of claim 11, further comprising uploading, without direction from the user, the recorded video to a remote video server in response to expiration of the reference length of time.

13. The method of claim 12, further comprising:
receiving, by the mobile communication device and from the remote video server, a video update that identifies a plurality of associated videos available for viewing by the user;
displaying, by the mobile communication device, an icon on a display of the mobile communication display, wherein the icon represents the plurality of associated videos;
sequentially playing, in response to a selection of the icon by the user, each video of the plurality of associated videos on the display, and
removing, without direction from the user, the icon that represents the plurality of associated videos from the display in response to each video of the plurality of associated videos having been played.

14. One or more non-transitory, computer-readable storage media comprising a plurality of instructions stored thereon that, in response to execution, cause a mobile communication device to:
generate, by a proximity sensor of the mobile communication device, proximity sensor data;
determine that the mobile communication device is positioned in a reference point-of-view position relative to a body of the user in response to a determination that (i) the mobile communication device is within a threshold distance from the body of the user based on the proximity sensor data, (ii) the camera is directed away from the body of the user, and (iii) the mobile communication device is in a portrait orientation when the mobile communication device is in the reference point-of-view position;
initiate, in response to a determination that the mobile communication device is in the reference point-of-view position and without direction from the user, recording of a video by the camera of the mobile communication device.

15. The one or more non-transitory, computer-readable storage of claim 14, wherein to determine whether the mobile communication device is positioned in the reference point-of-view position comprises to determine whether the mobile communication device is positioned in the reference point-of-view based on sensor data from at least one of a proximity sensor, a gyroscope sensor, or a light sensor of the mobile communication device.

16. The one or more non-transitory, computer-readable storage of claim 14, wherein the plurality of instructions further cause the mobile communication device to generate, in response to initiation of the recording of the video, a notification to the user to notify the user that recording of the video has been initiated.

17. The one or more non-transitory, computer-readable storage of claim 14, wherein the plurality of instructions further cause the mobile communication device to:
monitor a present position of the mobile communication device relative to the body of the user to determine whether the mobile communication device has been moved from the reference point-of-view position; and
discontinue recording of the video in response to a determination, by the mobile communication device, that the mobile communication device has been moved from the reference point-of-view position.

18. The one or more non-transitory, computer-readable storage of claim 14, wherein to initiate recording of the video comprises to record the video for a reference length of time.

19. The one or more non-transitory, computer-readable storage of claim 18, wherein the plurality of instructions further cause the mobile communication device to upload, without direction from the user, the recorded video to a remote video server in response to expiration of the reference length of time.

20. The one or more non-transitory, computer-readable storage of claim 19, wherein the plurality of instructions further cause the mobile communication device to:
receive, from the remote video server, a video update that identifies a plurality of associated videos available for viewing by the user;
display an icon on a display of the mobile communication display, wherein the icon represents the plurality of associated videos;

sequentially play, in response to a selection of the icon by the user, each video of the plurality of associated videos on the display, and remove, without direction from the user, the icon that represents the plurality of associated videos from the display in response to each video of the plurality of associated videos having been played.

\* \* \* \* \*